United States Patent
Burkhardt et al.

(10) Patent No.: US 8,087,402 B2
(45) Date of Patent: Jan. 3, 2012

(54) METHOD AND DEVICE FOR THE OPERATION OF AN INTERNAL COMBUSTION ENGINE COMPRISING AN EXHAUST-GAS TURBOCHARGER

(75) Inventors: Thomas Burkhardt, Neutraubling (DE); Jürgen Dingl, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/867,563

(22) PCT Filed: Feb. 3, 2009

(86) PCT No.: PCT/EP2009/051171
§ 371 (c)(1),
(2), (4) Date: Aug. 13, 2010

(87) PCT Pub. No.: WO2009/106404
PCT Pub. Date: Sep. 3, 2009

(65) Prior Publication Data
US 2011/0010072 A1 Jan. 13, 2011

(30) Foreign Application Priority Data
Feb. 27, 2008 (DE) .......................... 10 2008 011 415

(51) Int. Cl.
*F02M 25/07* (2006.01)
(52) U.S. Cl. ..................... 123/568.26; 701/108; 60/602; 60/612
(58) Field of Classification Search .......... 123/321–323, 123/65 VD, 568.11, 568.21, 568.26; 701/108; 60/600–602, 605.1, 605.2, 611, 612; 73/114.69, 73/114.74
See application file for complete search history.

(56) References Cited

U.S. PATENT DOCUMENTS

| | | | |
|---|---|---|---|
| 6,543,428 B1 * | 4/2003 | Blandino et al. | 123/585 |
| 6,996,986 B2 * | 2/2006 | Arnold | 60/602 |
| 7,076,955 B2 * | 7/2006 | Herz et al. | 60/612 |
| 7,174,777 B2 * | 2/2007 | Fischer et al. | 73/114.33 |
| 7,409,943 B2 * | 8/2008 | Benz et al. | 123/321 |
| 7,461,508 B2 * | 12/2008 | Rosin et al. | 60/612 |
| 2006/0026960 A1 | 2/2006 | Butscher et al. | 60/602 |
| 2008/0196404 A1 | 8/2008 | Kassner | 60/600 |

FOREIGN PATENT DOCUMENTS

| DE | 102005007558 | 9/2005 |
|---|---|---|
| DE | 102004042272 | 3/2006 |

OTHER PUBLICATIONS

International Search Report and Written Opinion for Application No. PCT/EP2009/051171 (11 pages), Apr. 8, 2009.

\* cited by examiner

*Primary Examiner* — John Kwon
(74) *Attorney, Agent, or Firm* — King & Spalding L.L.P.

(57) ABSTRACT

In order to operate an internal combustion engine with a turbocharger, a boost pressure prevailing downstream of a compressor (42) of the exhaust gas turbocharger and upstream of a cylinder intake port of the internal combustion engine is regulated to a predefined desired boost pressure value (PUT_SP). An actuation signal portion (DELTA_PWM_WG) of a controller for regulating the boost pressure to a desired boost pressure value (PUT_SP) is determined. A change in the turbocharger speed (DELTA_N_TCHA) associated with the actuation signal portion (DELTA_PWM_WG) of the controller is determined in accordance with the actuation signal portion (DELTA_PWM_WG) of the controller and an operating point of the internal combustion engine. A turbocharger speed limit (N_TCHA_MAX) is determined in accordance with the determined change in the turbocharger speed (DELTA_PWM_WG).

9 Claims, 1 Drawing Sheet

METHOD AND DEVICE FOR THE OPERATION OF AN INTERNAL COMBUSTION ENGINE COMPRISING AN EXHAUST-GAS TURBOCHARGER

CROSS-REFERENCE TO RELATED APPLICATIONS

This application is a U.S. National Stage Application of International Application No. PCT/EP2009/051171 filed Feb. 3, 2009, which designates the United States of America, and claims priority to German Application No. 10 2008 011 415.4 filed Feb. 27, 2008, the contents of which are hereby incorporated by reference in their entirety.

TECHNICAL FIELD

The invention relates to a method and device for operating an internal combustion engine. The internal combustion engine has an exhaust-gas turbocharger.

BACKGROUND

Modern internal combustion engines regularly comprise exhaust-gas turbochargers. An exhaust-gas turbocharger in principle comprises a turbine, which is disposed in an exhaust-gas tract of the internal combustion engine, and a compressor, which is disposed in an intake tract of the internal combustion engine and is mechanically coupled to the turbine. A rotational speed of the compressor, which may also be referred to as the turbocharger speed, may be controlled for example by means of a waste gate, which is disposed in a bypass around the turbine in the exhaust-gas tract.

The document DE 10 2005 007 558 A1 discloses a monitoring of at least one of the variables: increment rate, turbocharger speed and turbocharger speed for protecting a turbocharger connected to an engine from overspeeding in a vehicle having an exhaust-gas brake valve. Further disclosed is a closing of an exhaust-gas brake to reduce the speed of the turbocharger in each case as a response to the increment rate of the turbocharger speed being greater than or equal to a first limit value and the turbocharger speed being greater than or equal to a second limit value.

The document DE 10 2004 042 272 A1 discloses a controlling or controlling of the boost pressure of an internal combustion engine having a compressor in an air supply of the internal combustion engine, wherein an actuator is provided, by means of which the boost pressure of the compressor is adjusted. In dependence upon a rotational speed of the compressor an output signal for the actuator is determined.

SUMMARY

According to various embodiments, a method and a device for operating an internal combustion engine can be provided that enable easy and reliable controlling of a rotational speed of a turbocharger of the internal combustion engine.

According to an embodiment, a method of operating an internal combustion engine having an exhaust-gas turbocharger, may comprise: controlling a boost pressure prevailing downstream of a compressor of the exhaust-gas turbocharger and upstream of a cylinder inlet of the internal combustion engine to a preset setpoint value of the boost pressure, determining a controller actuating signal component of a controller for controlling the boost pressure to a setpoint value of the boost pressure, in dependence upon the controller actuating signal component and in dependence upon an operating point of the internal combustion engine, determining a turbocharger speed change, which is associated with the controller actuating signal component, and determining a limit value of the turbocharger speed is determined in dependence upon the determined turbocharger speed change.

According to a further embodiment, the limit value of the turbocharger speed can be determined in dependence upon the determined turbocharger speed change in that a preset basic limit value of the turbocharger speed is reduced by the determined turbocharger speed change. According to a further embodiment, the operating point of the internal combustion engine may comprise a value of a load variable of the internal combustion engine and a rotational speed of the internal combustion engine.

According to another embodiment, a device for operating an internal combustion engine having an exhaust-gas turbocharger, may be designed so as—to control a boost pressure prevailing downstream of a compressor of the exhaust-gas turbocharger and upstream of a cylinder inlet of the internal combustion engine to a preset setpoint value of the boost pressure, —to determine a controller actuating signal component of a controller for controlling the boost pressure to a setpoint value of the boost pressure, —to determine in dependence upon the controller actuating signal component and in dependence upon an operating point of the internal combustion engine a turbocharger speed change, which is associated with the controller actuating signal component, and to determine a limit value of the turbocharger speed in dependence upon the determined turbocharger speed change.

BRIEF DESCRIPTION OF THE DRAWINGS

There now follows a detailed description of exemplary embodiments with reference to diagrammatic drawings.
The drawings show.

DETAILED DESCRIPTION

Figure 1:
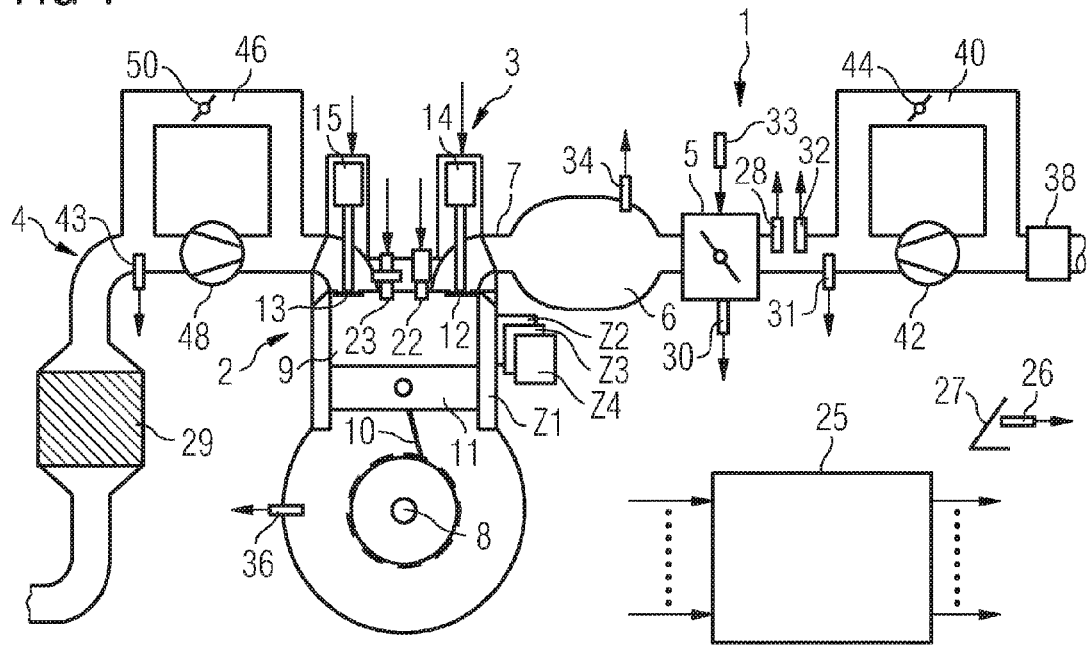
FIG. 1 an internal combustion engine,
FIG. 2 a flowchart of a program for operating the internal combustion engine.

According to various embodiments, in a method and a device for operating an internal combustion engine, the internal combustion engine has an exhaust-gas turbocharger and a boost pressure prevailing downstream of a compressor of the exhaust-gas turbocharger and upstream of a cylinder inlet of the internal combustion engine is controlled to a preset setpoint value of the boost pressure. A controller actuating signal component of a controller for controlling the boost pressure to a setpoint value of the boost pressure is determined. In dependence upon the controller actuating signal component and in dependence upon an operating point of the internal combustion engine a turbocharger speed change is determined, which is associated with the controller actuating signal component. A limit value of the turbocharger speed is determined in dependence upon the determined turbocharger speed change.

This is a simple way of preventing the turbocharger speed, in particular the rotational speed of the compressor, from reaching a critical range for the exhaust-gas turbocharger on account of the controller actuating signal component. The turbocharger speed is preferably limited in dependence upon the limit value of the turbocharger speed. For example, when the limit value of the turbocharger speed is reached, a setpoint torque of the internal combustion engine is automatically reduced. Alternatively or additionally, in dependence upon the limit value of the turbocharger speed further safety measures may be carried out and/or for example an entry may be made in an error memory of the internal combustion engine.

In an embodiment, the turbocharger speed change is determined such that it corresponds to a turbocharger speed change that may arise on account of a controller actuating signal component caused by a leakage downstream of the compressor and upstream of the cylinder inlet. In other words, any controller actuating signal component is interpreted as being caused by a leakage downstream of the compressor and upstream of the cylinder inlet. Whilst this means that controller actuating signal components on account of for example manufacturing tolerances or wear are falsely interpreted, it does however lead reliably to the compressor never over revving, with the result that the turbocharger speed reliably remains outside of the critical range of the turbocharger speed.

In a further embodiment, the limit value of the turbocharger speed is determined in dependence upon the determined turbocharger speed change in that a preset basic limit value of the turbocharger speed is reduced by the determined turbocharger speed change. This is a simple way of enabling the limit value of the turbocharger speed to be determined in dependence upon the determined turbocharger speed change.

In a further embodiment, the operating point of the internal combustion engine comprises a value of a load variable of the internal combustion engine and a rotational speed of the internal combustion engine.

In both figures elements of an identical construction or function are denoted by the same reference characters.

An internal combustion engine (FIG. 1) comprises an intake tract 1, an engine block 2, a cylinder head 3 and an exhaust-gas tract 4. The intake tract 1 preferably comprises a throttle valve 5, as well as a collector 6 and an intake manifold 7 that extends in the direction of a combustion chamber 9 of a cylinder Z1 through a cylinder inlet into the engine block 2. The engine block 2 further comprises a crankshaft 8, which is coupled by a connecting rod 10 to a piston 11 of the cylinder Z1. In the exhaust-gas tract 4 an exhaust-gas catalytic converter 29, for example in the form of a three-way catalytic converter, is preferably disposed. Besides the cylinder Z1, one or more further cylinders Z2-Z4 may be provided. Furthermore, any desired number of cylinders Z1-Z4 may be provided.

The cylinder head 3 comprises a valve gear having gas exchange valves, which are gas inlet valves 12 and gas outlet valves 13, and valve drives 14, 15 associated therewith. The cylinder head 3 further comprises an injection valve 22 and a spark plug 23. If the internal combustion engine is a diesel engine, the internal combustion engine may alternatively comprise no spark plug 23. Alternatively, the injection valve 22 may be disposed in the intake manifold 7.

A control device 25 is provided, with which are associated sensors that acquire various measured variables and determine in each case the value of the measured variable. Operating variables comprise the measured variables and variables derived from the measured variables. An operating point of the internal combustion engine is defined by means of at least one value of an operating variable, preferably by means of one value each of a plurality of operating variables. The control device 25 in dependence upon at least one of the measured variables determines manipulated variables that are then converted into one or more actuating signals for controlling the final control elements by means of corresponding operators. The control device 25 may also be referred to as a device for operating the internal combustion engine.

Figure 2:
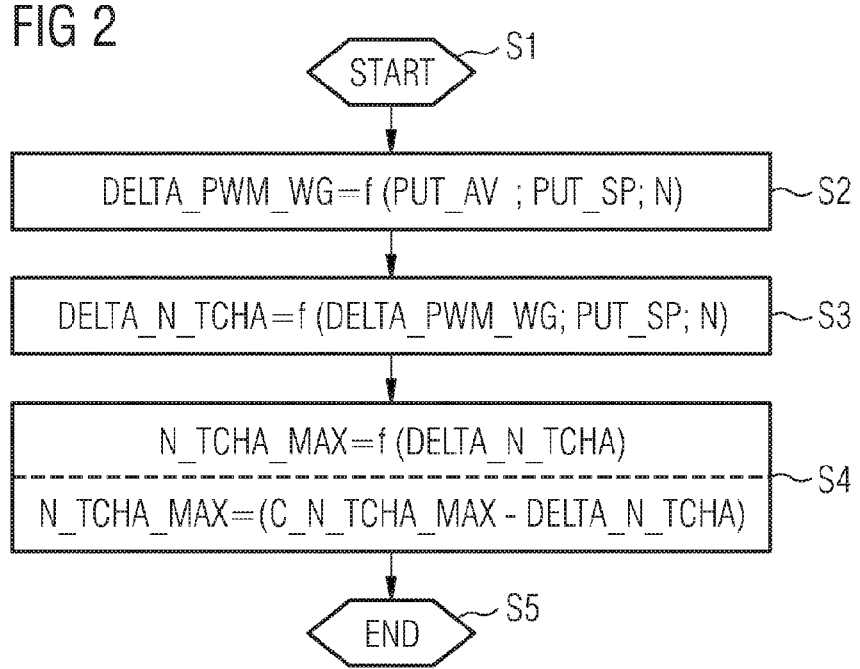

The sensors are a pedal position sensor 26 that acquires an accelerator pedal position of an accelerator pedal 27, an air-mass sensor 28 that acquires an air-mass flow upstream of the throttle valve 5, a throttle-valve position sensor 30 that acquires an opening angle of the throttle valve 5, a boost-pressure sensor 31 that acquires a boost pressure upstream of the throttle valve 5 and downstream of a compressor 42, a temperature sensor 32 that acquires an intake-air temperature, an intake-manifold pressure sensor 34 that acquires an intake-manifold pressure in the collector 6, a crankshaft sensor 36 that acquires a crankshaft angle, with which a speed N (FIG. 2) is then associated. A lambda sensor 43 may further be provided, the measuring signal of which is representative of the oxygen content in the exhaust gas and hence supplies information about the mixture composition of the internal combustion engine.

According to various embodiments, any desired subset of the described sensors may be provided or additional sensors may also be provided.

The final control elements are for example a throttle-valve actuator 33 for adjusting the throttle valve 5, the gas inlet- and gas outlet valves 12, 13, the injection valve 22, the spark plug 23, an actuator for adjusting a compressor bypass valve 44 and/or a valve actuator for adjusting a turbine bypass valve 50.

The compressor 42 is disposed in the intake tract 1 upstream of the throttle valve 5 and downstream of an air filter 38. By means of a compressor bypass 40, in dependence upon a defined activation of the actuator for adjusting the compressor bypass valve 44 fresh air may, after flowing through the compressor 42, be routed back to the suction side of the compressor 42.

An exhaust-gas turbocharger comprises the compressor 42 and a turbine 48, which for driving the compressor 42 is mechanically coupled to the compressor 42 and which is disposed in the exhaust-gas tract 4 such that it may be driven by the exhaust gas from a combustion process into the combustion chamber 9. By means of a turbine bypass 46 the exhaust gas may be routed past the turbine 48 in such a way that the exhaust gas routed through the turbine bypass 46 does not drive the turbine 48. The exhaust gas is routed past the turbine 48 in dependence upon a preset activation of the valve actuator for adjusting the turbine bypass valve 50. The turbine bypass valve 50 may also be referred to as a waste gate. As an alternative or in addition to the waste gate, the turbine may be controlled by means of a variable turbine geometry.

A turbocharger speed, which preferably represents a rotational speed of the compressor 42, is preferably controlled by activation of the valve actuator for adjusting the turbine bypass valve 50. Activation of the valve actuator for adjusting the turbine bypass valve 50 is effected preferably by means of a waste-gate actuating signal PWM_WG, which is dependent upon a pilot control, in particular upon a pilot value that is dependent upon the operating point of the internal combustion engine. The pilot value may be determined for example in dependence upon the operating point by means of a characteristics map which, like any other characteristics map, is recorded for example on an engine test bed and preferably stored on a storage medium of the control device 25. Activation of the valve actuator for adjusting the turbine bypass valve 50 may further be effected by means of a controller actuating signal component DELTA-PWM-WG, which is produced by a controller for controlling the turbocharger speed. In other words, the controller actuating signal component DELTA-PWM-WG represents a controller-conditioned actuating signal deviation from the actuating signal based on the pilot value. The controller actuating signal component DELTA-PWM-WG varies the waste-gate actuating signal PWM_WG based on the pilot control preferably in such a way that for example manufacturing tolerances, wear or faults, such as a leakage, of the internal combustion engine are compensated. The operating point comprises for example the rotational speed N of the internal combustion engine and a value of a load variable of the internal combustion engine, for example a setpoint value PUT_SP of the boost pressure.

In the event of a leakage downstream of the compressor 42 and upstream of the cylinder inlet, during turbocharged engine operation the intake-manifold pressure acquired by the intake-manifold pressure sensor 34 and/or the boost pressure acquired by the boost-pressure sensor 34 reduces while the turbocharger speed remains constant. In order to raise this intake-manifold pressure to a corresponding setpoint value, the controller increases the turbocharger speed by means of the controller actuating signal component DELTA-PWM-WG.

A program for operating the internal combustion engine is preferably stored on the storage medium of the control device 25. The program is used to determine a limit value of the turbocharger speed such that also in the case of a high controller actuating signal component DELTA-PWM-WG, for example on account of the leakage downstream of the compressor 42 and upstream of the cylinder inlet the turbocharger speed remains below a critical range of the turbocharger speed.

The program (FIG. 2) is preferably started in a step S1, in which optionally variables are initialized, for example at a time close to an engine start of the internal combustion engine.

In a step S2 the controller actuating signal component DELTA-PWM-WG is determined in dependence upon the difference between an actual value PUT_AV and the setpoint value PUT_SP of the boost pressure and in dependence upon the operating point of the internal combustion engine. The operating point of the internal combustion engine is preferably defined by the setpoint value PUT_SP of the boost pressure and the speed N of the internal combustion engine.

In a step S3, in dependence upon the controller actuating signal component DELTA-PWM-WG and the operating point of the internal combustion engine a turbocharger speed change DELTA-N-TCHA is determined. For this purpose, on the storage medium of the control device 25 preferably a further characteristics map is stored, in which the turbocharger speed change DELTA-N-TCHA is plotted against the operating point and against the controller actuating signal component DELTA-PWM-WG. The characteristics map is for example recorded on an engine test bed by introducing defined leakages downstream of the compressor 42 and upstream of the cylinder inlet and observing the controller actuating signal component DELTA-PWM-WG.

In a step S4, in dependence upon the turbocharger speed change DELTA-N-TCHA a limit value N-TCHA-MAX of the turbocharger speed is determined. Preferably the limit value N-TCHA-MAX of the turbocharger speed is determined in dependence upon a basic limit value C-N-TCHA-MAX of the turbocharger speed and in dependence upon the determined turbocharger speed change DELTA-N-TCHA, preferably in accordance with the calculation specification indicated in the step S4.

In a step S5 the program may be terminated. Preferably, however, the program is executed regularly during operation of the internal combustion engine. Furthermore, preferably in dependence upon the determined limit value N-TCHA-MAX of the turbocharger speed the speed of the turbocharger, in particular of the compressor 42 is limited. Furthermore, in dependence upon the controller actuating signal component DELTA-PWM-WG and/or in dependence upon the limit value N-TCHA-MAX of the turbocharger speed at least one further back-up function is activated and/or an entry is made in an error memory of the internal combustion engine.

The invention claimed is:

1. A method of operating an internal combustion engine having an exhaust-gas turbocharger, the method comprising:
    controlling a boost pressure prevailing downstream of a compressor of the exhaust-gas turbocharger and upstream of a cylinder inlet of the internal combustion engine to a preset setpoint value of the boost pressure,
    determining a controller actuating signal component of a controller for controlling the boost pressure to a setpoint value of the boost pressure
    in dependence upon the controller actuating signal component and in dependence upon an operating point of the internal combustion engine, determining a turbocharger speed change, which is associated with the controller actuating signal component,
    determining a limit value of the turbocharger speed in dependence upon the determined turbocharger speed change.

2. The method according to claim 1, wherein the limit value of the turbocharger speed is determined in dependence upon the determined turbocharger speed change in that a preset basic limit value of the turbocharger speed is reduced by the determined turbocharger speed change.

3. The method according to claim 1, wherein the operating point of the internal combustion engine comprises a value of a load variable of the internal combustion engine and a rotational speed of the internal combustion engine.

4. A device for operating an internal combustion engine having an exhaust-gas turbocharger, wherein the device is configured
    to control a boost pressure prevailing downstream of a compressor of the exhaust-gas turbocharger and upstream of a cylinder inlet of the internal combustion engine to a preset setpoint value of the boost pressure,
    to determine a controller actuating signal component of a controller for controlling the boost pressure to a setpoint value of the boost pressure,
    to determine in dependence upon the controller actuating signal component and in dependence upon an operating point of the internal combustion engine a turbocharger speed change, which is associated with the controller actuating signal component,
    to determine a limit value of the turbocharger speed in dependence upon the determined turbocharger speed change.

5. The device according to claim 4, wherein the device is further configured to determine the limit value of the turbocharger speed in dependence upon the determined turbocharger speed change in that a preset basic limit value of the turbocharger speed is reduced by the determined turbocharger speed change.

6. The device according to claim 4, wherein the operating point of the internal combustion engine comprises a value of a load variable of the internal combustion engine and a rotational speed of the internal combustion engine.

7. A system for operating an internal combustion engine having an exhaust-gas turbocharger, comprising:
    means for controlling a boost pressure prevailing downstream of a compressor of the exhaust-gas turbocharger and upstream of a cylinder inlet of the internal combustion engine to a preset setpoint value of the boost pressure, means for determining a controller actuating signal component of a controller for controlling the boost pressure to a setpoint value of the boost pressure, means for determining a turbocharger speed change, which is associated with the controller actuating signal component in dependence upon the controller actuating signal component and in dependence upon an operating point of the internal combustion engine, means for determining a limit value of the turbocharger speed in dependence upon the determined turbocharger speed change.

8. The system according to claim 7, wherein the limit value of the turbocharger speed is determined in dependence upon the determined turbocharger speed change in that a preset basic limit value of the turbocharger speed is reduced by the determined turbocharger speed change.

9. The system according to claim 7, wherein the operating point of the internal combustion engine comprises a value of a load variable of the internal combustion engine and a rotational speed of the internal combustion engine.

* * * * *